United States Patent
Bourgoin et al.

[11] 3,774,986
[45] Nov. 27, 1973

[54] RECORDING SUPERIMPOSED HOLOGRAMS

[75] Inventors: Jacques Bourgoin, Montgeron; Jean-Pierre Budin, Paris; Rene Lenfant, Paray-Vietille-Post, all of France

[73] Assignee: Compagnie Generale D'Electricite, Paris, France

[22] Filed: Nov. 2, 1972

[21] Appl. No.: 303,172

[30] Foreign Application Priority Data
Nov. 5, 1971 France .............................. 7139858

[52] U.S. Cl. ................... 350/3.5, 350/147, 350/157, 350/159
[51] Int. Cl. .............................................. G02b 3/00
[58] Field of Search .................... 350/3.5, 147, 150, 350/151, 157–159

[56] References Cited
UNITED STATES PATENTS
3,560,071   2/1971   Silverman .......................... 350/3.5
3,578,837   5/1971   Brooks ............................... 350/3.5
3,615,123   10/1971  Wuerker ............................ 350/3.5

*Primary Examiner*—David Schonberg
*Assistant Examiner*—Michael J. Tokar
*Attorney*—Richard C. Sughrue et al.

[57] ABSTRACT

Where superimposed holograms are produced on the same photosensitive element by recording the interferences of two coherent beams comprising a reference beam and an object beam with each reference beam being, for each object, in a different direction from the preceding ones in relation to the photosensitive element and achieved by successively rotating the same light beam, the same beam and said object beam are subjected respectively to a rectilinear polarization in a predetermined direction and the rectilinear polarization directions of the object and reference beams are subjected to a rotation identical to that of said same beam.

13 Claims, 1 Drawing Figure

PATENTED NOV 27 1973  3,774,986
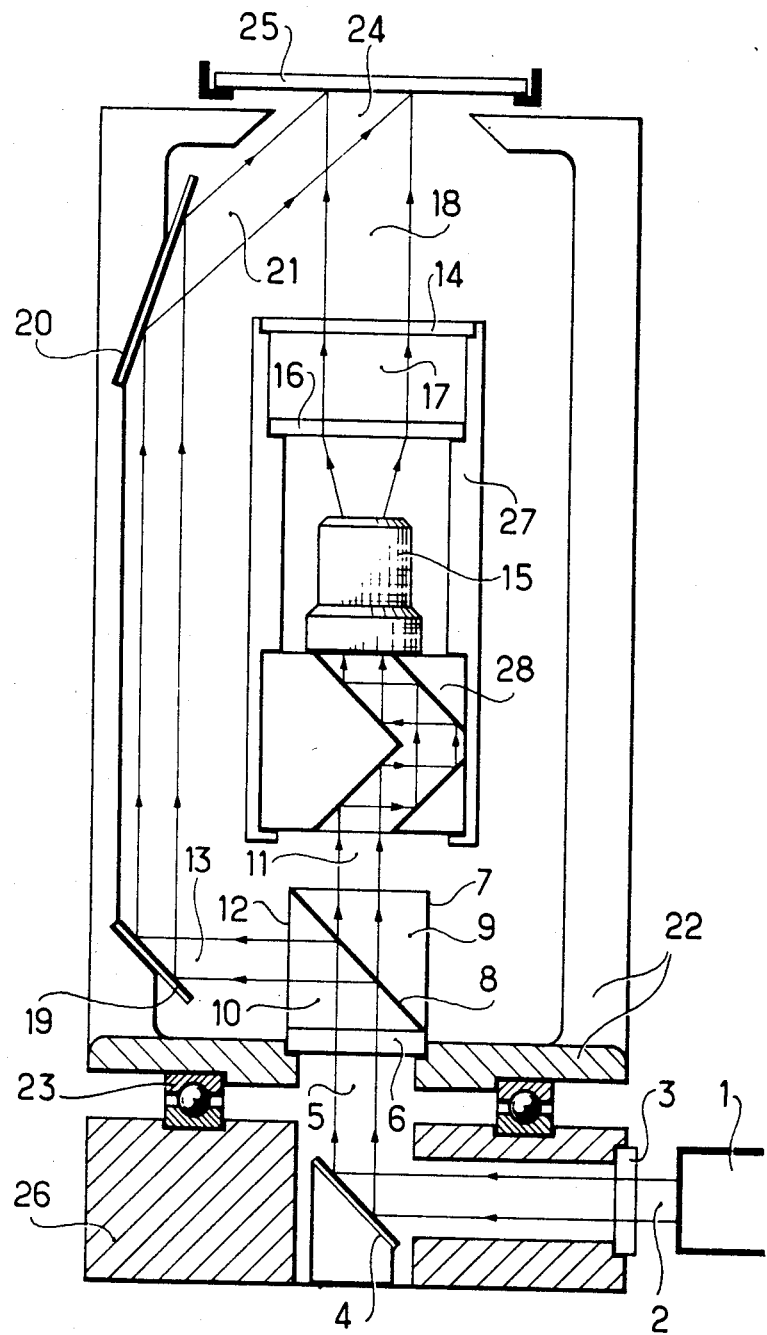

RECORDING SUPERIMPOSED HOLOGRAMS

BACKGROUND OF THE INVENTION

1. Field of the Invention

The present invention concerns methods and devices for recording superimposed holograms on a same photosensitive element.

2. Description of the Prior Art

It is known that, to produce a halogram of an object, the interferences formed by superimposing two beams of coherent and preferably monochromatic light, are recorded on a photosensitive element having a memory, such as, for example, a photographic plate, one of these beams being known as a "reference" beam, and the other, a beam coming from the object, illuminated by a beam of the same kind and coherent with the reference beam.

To obtain two coherent beams which are capable of being superimposed, a single light source, such as, for example, a laser generator emitting a beam whose coherence and monochromatic nature are well-known, is used.

This beam is divided by an optical separator into two beams, one of these beams illuminating the object so that the latter gives, by diffusion, the first of the beams known as an "object" beam, and the other constituting the "reference" beam. These two beams are sent on a same path and a photographic plate which records the superimpositions produced by these two coherent beams, which are representative of the object, is placed in the coincident part of their path. Indeed, on illuminating the photographic plate with a beam pointed in the same direction as that of the reference beam which has been used for recording, the object is restored. It is also known that it is possible to record on a same photographic plate several superimposed holograms of several different or same objects. To do this, when recording different objects, it is sufficient to point the reference beams in various directions, each direction of the reference beam for a given object being different from the preceding directions. Thus, when several superimposed holograms of objects have been recorded, to restore one among all those recorded on the photographic plate it is sufficient to memorize that photographic plate memorizing the various holograms of various objects by a reference beam pointed in the same direction as the reference beam which was used for recording the hologram of the object which is to be restored.

Devices enabling such recordings of superimposed holograms to be effected are known. These are generally constituted by a source, such as a laser generator emitting a light beam, generally rectilinearly polarized, a separator making it possible to divide the beam emitted into two beams, a beam for illuminating an object, giving rise, for example, by diffusion, to the object beam, the second beam constituting the reference beam, that reference beam being deflected over at least a same part of a path, by means of reflecting mirrors.

To point reference beams in various directions in relation to a photographic plate, it is sufficient to make the separator and the mirrors rotate so as to subject the reference beam to successive rotations, for example about a point or an axis.

In this latter case, the various propagation directions of the reference beam occupy the discreet generating lines of a cone whose axis is that about which the reference beam is subjected to rotations.

To produce holograms, it is necessary to have a source of coherent light having sufficient power to be able to make an impression on photographic plates.

The most suitable sources of this are laser generators which generally send out polarized light beams in a rectilinear direction, but the use of such generators as sources of light beams in devices for producing superimposed holograms as described previously have a disadvantage, indeed, the rotation of certain mirrors causes variations of contrasts between the various holograms, these variations of contrasts being due to the various positions in which the polarizations of the beams which are superimposed are directed.

The present invention aims at implementing a method and producing a device enabling the recording of superimposed holograms on a same photosensitive element in order to obtain an identical contrast for all the superimposed holograms.

SUMMARY OF THE INVENTION

The object of the present invention is a method for producing holograms of several objects superimposed on a same photosensitive element by recording the superimpositions of two coherent beams, a reference beam and an object beam, coming from each object to be holographed, each reference beam being directed, for each object, in a different direction from the preceding directions in relation to said photosensitive element, the various directions being obtained by successive rotations of a same light beam, characterized in that said same beam and object beam respectively have a determined rectilinear polarization direction and in that for each rotation of that same light beam, the rectilinear polarization directions of these two beams are subjected to a rotation identical to that of the same beam.

The present invention also has for its object a device making it possible to implement the method, characterized in that it comprises a source of a coherent light beam, an optical separator to give rise to a first beam and a second beam originating from said emitted beam, means for illuminating one of said objects derived from said first beam, the illuminated object giving rise to an object beam, said second beam constituting the reference beam, means for directing said reference beam, over at least a part of the path of the object beam, means for polarizating said object beam and reference beam linearly, means for changing the direction by rotation of the said reference beam for each object to be holographed, means for making the rectilinear polarization direction of said beams undergo a rotation identical to that of said reference beam when the latter undergoes such rotation, a photosensitive element having a memory being arranged in the common part of the paths of the said object beam and reference beam in a determined position.

BRIEF DESCRIPTION OF THE DRAWING

Other characteristics and advantages of the present invention will become apparent from the following description given with reference to the accompanying drawing, by way of illustration but having no limiting character, in which the single FIGURE is a schematic, sectional view of an embodiment of a device according to the invention which affords a great advantage, enabling the method according to the invention to be implemented.

DESCRIPTION OF THE PREFERRED EMBODIMENT

The device shown in the single FIGURE comprises a source 1 of a beam 2 of coherent light which is preferably monochromatic, rectilinearly polarized.

That source may, to great advantage, be constituted by a gas or solid laser generator in which the ends of the discharge tube arranged in the cavity are closed by a plate inclined at Brewster incidence.

The beam 2 crosses through a quarter-wave plate 3 and is reflected on a mirror 4 to give rise to a circularly polarized beam 5. The source 1, the plate 3 and the mirror 4 are arranged on a base 26 having a stable and fixed position. The circularly polarized beam 5 crosses through a second quarter-wave plate 6 fixed to the input face of a separator 7 constituted by a partially reflecting and partially transparent face 8 consisting of the separating diopter of two prisms 9 and 10 fixed together, constituting a plate having a parallel face for the part 11 of the beam 5 not deviated and having a face 12 through which the deviated part 13 of the beam 5 emerges.

The quarter-wave plate 6 is chosen so that the circularly polarized beam 5 be rectilinearly polarized after having crossed through it, and that preferably, the rectilinear polarization direction of the beam emerging from the plate 6 be coincident with a neutral direction of the reflecting face 8, that is, parallel to the plane of that reflecting face 8, if it is constituted by a plane surface, this being generally the case.

The beam 11 lights up an object 14 to be holographed. To do this, it passes through a lens 15 behind which is arranged, for example a ground glass 16 enabling the object 14 to be illuminated evenly. In the case of the figure, the object illuminated by the beam 17 gives rise, by transmission, to an object beam 18, the object 14 being constituted by a diapositive.

In the case of the FIGURE, an illuminated object giving rise, by transmission, to an object beam has been chosen, but it is quite evident that the device may function in the same way when illuminating an object which would produce an object beam by reflection.

The deviated part 13 of the beam 5 undergoes two successive reflections on two mirrors 19 and 20 to give rise to a beam 21 constituting the reference beam. The mirrors 19 and 20 as well as the separator 7 and the quarter wave plate 6 are arranged on a same support 22 which may pivot in relation to the base 26 by means, for example, of a circular ball bearing 23, the aim of this being to make the beam 21 rotate so that the latter surrounds a cone having a substantially circular cross-section whose axis is coincident substantially with the axis of propagation of the beams 11 and 18. The mirrors 19 and 20 are arranged on the support 22 so that the beam 21 is superimposed on the object beam 18, for example, in the region 24 in which is arranged a photographic plate 25 having a determined position independent from that of the support 22, that plate 25 possibly being connected, for example, to the base 26. The means for illuminating and bearing the object 14 arranged on a stand 27, by means of the beam 11, are independent from the position of the support 22 when the latter rotates. Moreover, such a device may comprise, when the laser beam used does not emit a beam having great coherence, an optical delay for appreciably equalizing the optical path of the beams giving rise respectively to the object and reference beams. The FIGURE shows that optical delay contrivance constituted by a prismatic part 28 having four successive reflections arranged on the path of the beam giving rise, after having illuminated the object to the object beam 18.

The operation of the device is as follows:

The quarter wave plate 3 circularly polarizes the rectilinearly polarized beam 2 coming from the source 1. The quarter wave blade 6 rectilinearly polarizes the beam circularly polarized by the plate 3 by placing it in a polarization direction parallel to the plane of the surface 8.

When a hologram of an object is recorded, the latter is placed on its stand 27 and the support 22 is placed in a position which determines the direction of the reference beam 21.

The hologram of the first object is recorded in that position.

Then, to superimpose, on that first hologram, the hologram of a second object, the first object is replaced on its stand by the second, and the support 22 is subjected to a rotation in relation to the base 26 to place the reference beam 21 in a new direction in relation to the photosensitive plate 25 which is left in the same position as for the recording of the first hologram of the first object, and the operation is subsequently the same for all the objects, subjecting the support 22 to successive rotations so that the direction of the reference beam 21 be each time in a different direction from the preceding ones.

Of course, without moving the support 22, the direction of the beam 21 may be changed by moving, for example, the mirror 20 and by inclining it adequately so that the beam 21 be subjected to a movement which is the equivalent of a rotation substantially about a point contained in the part common to the reference beam 21 and the object beam 18.

In all these rotations, as the quarter wave plate 6 is fast with the separator 7, and as the latter, as well as the mirrors 19 and 20 are fast with the support 22, the polarization directions of the transmitted beam 11, 15 and 18 as well as that of the beams 13 and 21, always remain in determined positions in relation to each other, and as it is chosen preferably parallel to the plane of the reflecting surface 8, the rectilinear polarization directions of the object beam and reference beam are constantly parallel, whatever rotations the support 22 be subjected to.

It must be understood that the invention is in no way limited to the embodiment described and illustrated, which has been given only by way of an example. More particularly, without going beyond the scope of the invention, certain arrangements may be changed or certain means may be replaced by equivalent means.

What is claimed is:

1. In a method for producing superimposed holograms, on the same photosensitive element, of several objects by recording the interferences of two coherent beams, a reference beam and an object beam coming from each object to be holographed, each reference being, for each object, in a direction different from the preceding ones in relation to the said photosensitive element, the various directions being obtained by successive rotations of a same light beam, the improvement comprising:
providing for said same beam and object beam, respectively, a rectilinear polarization in a determined direction, and
subjecting, for each rotation of that same light beam, the rectilinear polarization directions of said object and reference beams to a rotation identical to that of the same beam.

2. The method according to claim 1, wherein the polarization directions of the object and reference beams are parallel.

3. A device for producing superimposed holograms on the same photosensitive element, comprising:
a source of coherent light beam,
an optical separator to give rise to a first beam and a second beam, originating from said source beam,
means for illuminating one of the said objects from the first beam, said illuminated object giving rise to an object beam, said second beam constituting the reference beam,
means for directing said reference beam on at least a part of the path of the object beam,
means for polarizing rectilinearly said object beam and said reference beam,
means for changing the direction, by rotation of said reference beam for each object to be holographed,
means for subjecting the rectilinear polarization direction of said object and reference beams to a rotation identical to that of the said reference beam when the latter is subjected to a rotation, said photosensitive element having a memory being arranged in the common part of the paths of the said object beam and reference beam in a determined position.

4. The device according to claim 3, wherein: said separator is constituted by a partially transparent and reflecting surface.

5. The device according to claim 4, wherein: said surface is constituted by the separating diopter of two prisms fixed together.

6. The device according to claim 3, wherein: said means for illuminating one of the said objects comprises a zero vergency lens and a ground glass arranged behind the said lens so that the light diffused by that ground glass illuminates the said object.

7. The device according to claim 3, wherein: said means for directing said second beam onto the object beam comprises at least one reflecting surface, reflecting the said second beam emerging from the separator, on a part of the path of the said object beam.

8. The device according to claim 3, wherein: said means for polarizing rectilinearly said object beam and reference beam comprise a first quarter wave plate, said source of coherent light sends out a beam of circularly polarized light, and said quarter wave plate is arranged on the path of the said beam of coherent light before it crosses through the said separator.

9. The device according to claim 8, wherein: said source of circularly polarized light comprises a laser generator sending out a beam of rectilinearly polarized light and a second quarter wave plate arranged at the output of the said generator.

10. The device according to claim 3, wherein said means for changing the direction of the said reference beam by rotating, comprise said separator and reflecting surface connected with means for subjecting them to rotations having the same amplitude and direction.

11. The device according to claim 10, wherein: said means for subjecting the rectilinear polarization direction of said beams to a rotation identical to that of the reference beam when the latter is subjected to a rotation, comprises said first quarter wave blade connected with the said separator and reflecting surface and means subjecting said blade, said separator and said reflecting surface to rotations having the same amplitude and the same direction.

12. The device according to claim 3, further comprising at least an optical delay contrivance arranged on one of the paths of the said first and second beams.

13. A device for producing superimposed holograms on the same photosensitive element comprising:
a fixed base,
a generator fast with said fixed base generating a rectilinearly polarized beam and a first quarter wave plate arranged at the output of the said generator and fast within a support which is mobile in relation to the said base,
a source of coherent light beam,
a second quarter wave blade,
an optical separator dividing said source beam which has crossed through the said second quarter wave plate into a first and second beam,
means for illuminating an object in a fixed position in relation to the said base, by the first beam, and
at least one mirror fixed on the said support for deviating the said second beam on the path of the beam emerging from the said object illuminated by the said first beam, and said photosensitive plate being arranged in the part common to the said preceding beams in a fixed position in relation to said base.

* * * * *